Feb. 12, 1946.   A. L. PARKER   2,394,632
COUPLING STRUCTURE FOR FLEXIBLE TUBES
Original Filed March 31, 1941
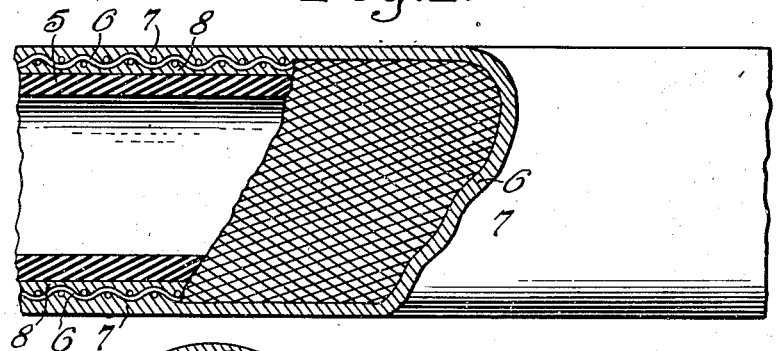
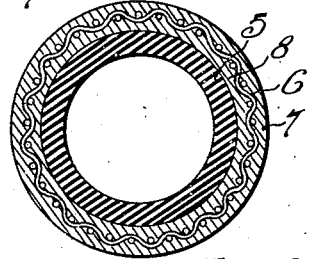
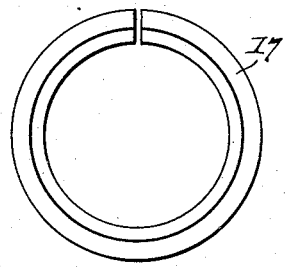
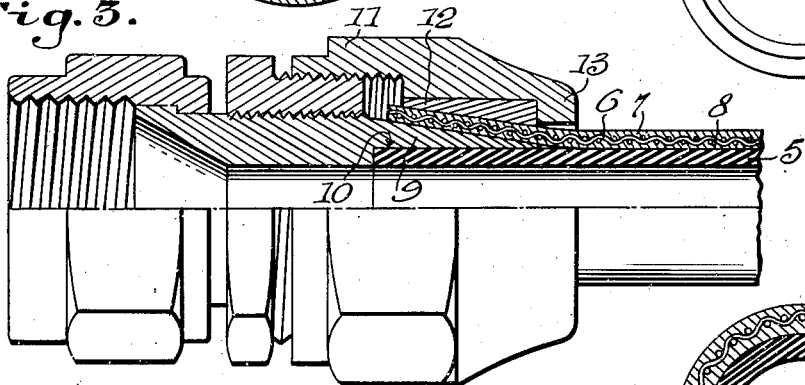
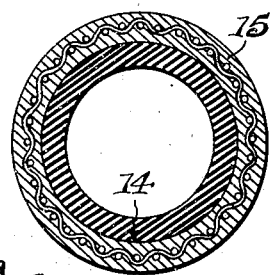
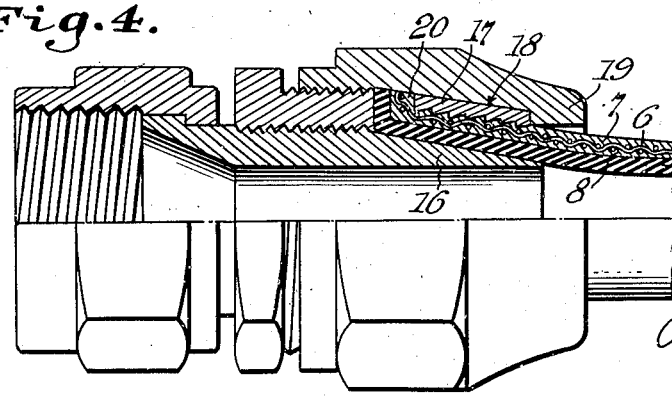
Inventor
Arthur L. Parker
By
Mason, Porter & Diller
Attorneys Patented Feb. 12, 1946

2,394,632

UNITED STATES PATENT OFFICE 2,394,632

COUPLING STRUCTURE FOR FLEXIBLE TUBES

Arthur L. Parker, Cleveland, Ohio, assignor to The Parker Appliance Company, Cleveland, Ohio, a corporation of Ohio Original application March 31, 1941, Serial No. 386,211. Divided and this application August 17, 1942, Serial No. 455,127

2 Claims. (Cl. 285—72)

The invention relates generally to flexible tubing and couplings therefor and primarily seeks to provide novel coupling structure peculiarly adapted for efficiently coupling this type of tubing.

An object of the invention is to provide a novel coupling structure for securely coupling a flexible tube, said coupling including a tapered male element terminating in a relatively sharp extremity insertible between an inner tube portion and an outer tube portion or enclosing sheath of the flexible tube, a sheath for snugly receiving the end extremity of the inner tube portion and against which said end extremity will be firmly pressed by internal pressure within the tube, and a flared clamping ring which is forced, by threading home of a female element of the coupling, into tight clamping and sealing contact with the external surface of the end extremity of the outer tube or sheath portion.

Another object of the invention is to provide a novel coupling structure for securely coupling a flexible tube and in which is included a tapered male element extension insertible into the end of the tube end extremity, and an internally ridged or roughened and split ferrule which is forced into intimate clamping and sealing contact with the external end of the tube by clamping and abutting surfaces provided on a female coupling element when said female element is threaded home on the male element.

This case is a division of the copending application for U. S. Letters Patent, Serial No. 386,211, filed by Arthur L. Parker on March 31, 1941.

With the above and other objects in view that will hereinafter appear, the nature of the invention will be more fully understood by following the detailed description, the appended claims and the several views illustrated in the accompanying drawing.

In the drawing:

Figure 1 is a part side elevation and part central longitudinal section of a flexible tube structure adaptable for being secured in a coupling structure embodying the invention.

Figure 2 is a vertical cross section of the tubing structure illustrated in Figure 1.

Figure 3 is a part central longitudinal section and side elevation of a coupling embodying the invention and adapted for efficiently coupling the tube structure illustrated in Figures 1 and 2.

Figure 4 is a view similar to Figure 3, illustrating a modified form of the coupling structure.

Figure 5 is a view similar to Figure 2 illustrating a tubing structure adaptable for being secured in the coupling illustrated in Figure 4.

Figure 6 is an end view illustrating the split ring or ferrule embodied in the coupling structure of Figure 4.

In this disclosure there are illustrated two specific forms of flexible tube structures which the improved coupling structures involving the invention are peculiarly adapted to couple, but it is to be understood that other forms of tube structures can be coupled by said coupling structures, and the invention is not to be considered as limited to the coupling of specific tubular structures such as are herein described.

In the tubing structure illustrated in Figures 1 and 2 of the drawing, there is included a rubber or synthetic rubber inner tube 5 which is loosely inserted within an enclosing sleeve 6 of braided glass fibers. Over the sleeve 6 there is applied a coating of a suitable flexible plastic 7, said coating being applied in a manner for causing the plastic to penetrate the interstices of the sleeve 6 and coat the glass fibers with a thin film of the plastic. This coating reaches the inner side of the braided glass fiber sleeve, as at 8, so that said sleeve is in fact completely embedded within the thin coating of the plastic. The protective coating 7, 8 preferably comprises either a vinyl polymer or a chlorinated vinyl polymer, although other suitably flexible plastics or lacquers may be employed.

In Figure 3 of the drawing, an extremity of a tube structure such as is illustrated in Figures 1 and 2, and in which the inner tube 5 is not bonded to the surrounding sleeve structure, is shown coupled or securely clamped in a suitable form of coupling. The coupling illustrated includes a tapered male element 9 which surrounds a seat 10 for receiving the end extremity of the inner tube 5, said element 9 terminating in a relatively sharp end extremity insertible between the inner tube 5 and the surrounding sleeve structure 6, 7, 8 in the manner illustrated in Figure 3. When the female element or nut 11 of the coupling is threaded home on the male element, a flared clamp ring 12 mounted therein and engaged by the abutment shoulder 13 of the nut engages the external surface of the sleeve 6, 7, 8 and clamps the same in sealing contact against the external surface of the tapered male element extension 9. The flexible plastic 7, 8 surrounding the glass braided fibers serves to cushion the clamping pressure so that the metal seats do not shear the glass fibers. The joint is sealed against leakage by pressure of the fluid within the tube and coupling acting outwardly to press the rubber tubing 5 tightly against the seat 10.

In Figure 5 of the drawing, there is illustrated a modified form of the tubing which is particularly adaptable to use in low pressure lines, or lines which may at times be subjected to suction internally. In such lines it is preferable to bond the rubber 5 to the surrounding braided glass fiber sleeve. In this form of the invention, it is preferred that the coating material which coats the braided sleeve and forms a protective film around the individual glass fibers comprising the same shall also act as a bond to secure the inner tube and the surrounding sleeve together as at 14. When the braided glass fiber sleeve and the inner rubber tube are to be bonded in this manner, it is preferred to use but one material as the bonding agent and the protective coating. This material, designated 15, preferably comprises a cement or plastic of the type corresponding with or having an affinity for the material of the rubber tube so that the two can be vulcanized together, thus, if "neoprene" synthetic rubber is used for the tube, a "neoprene" cement may be employed as the bonding and coating agent.

The coating materials herein referred to thoroughly penetrate and form a thin film on the individual multiple fibers in the braided strands, thus when the fibers flex in the tubing while it is in service, the fibers are cushioned against direct rubbing contact one with the other, and severing or breaking of the fibers is prevented.

In Figure 4 of the drawing, there is illustrated a coupling adapted for securely clamping tube structures in which the inner tube and the surrounding, braided glass fiber sleeve are bonded. It would, of course, be possible, even in a tube thus bonded, to separate the tube and sleeve and clamp the tube extremity in the manner illustrated in Figure 3, but since this is a somewhat difficult and time consuming operation, it may be found desirable to provide a coupling of the nature illustrated in Figure 4. This coupling may be somewhat similar to the coupling of Figure 3 but in it the whole end of the tube is clamped between the tapered male element extension 16 and a split and internally, annularly ribbed ferrule 17 which surrounds the tube end in opposition to the extension 16 and is forced into the tube end clamping position illustrated in Figure 4 by the inclined surface 18 and the end abutment 19 of the female element when this element is threaded home on the male element. During this clamping of the tube end, the extremity of the tube is crowded, as at 20, to additionally assure perfect sealing of the joint. While it is stated hereinabove that the coupling structure illustrated in Figure 4 is particularly designed for coupling a tube structure such as is illustrated in Figure 5 wherein the inner rubber tube is bonded to the surrounding sheath structure as at 14, it is to be understood that a tube structure such as is illustrated in Figures 1 and 2 of the drawing in which the inner tube of rubber and the surrounding sheath structure are not bonded, or other forms of tubular structure may also be efficiently coupled in the structure illustrated in Figure 4.

It is of course to be understood that the details of structure and arrangement of parts may be variously changed and modified without departing from the spirit and scope of my invention.

I claim:

1. In a coupling, a flexible tube structure, a male element having a tapered extension receivable in an end of the tube structure, a contractible ring having a roughened interior engaging the exterior of the tube and having its outer surface in generally parallel spaced relation to the external surface of the tapered extension, a female element threadably connected with the male element, said female element having a clamping surface thereon engaging the external surface of said contractible ring throughout its length and effective when the female element is screwed home on the male element to imbed the roughened ring surface in the tube and also force the tube along and securely clamp said tube end against said tapered extension, said male element having an abutment wall thereon spaced a limited distance from and opposed to the adjacent inner end of said ring and defining with said ring end an annular space into which the end extremity of the tube is crowded outwardly in a direction generally transverse with respect to the axis of the tube and beyond said clamping surface during threading home of the female element on the male element and the longitudinal movement of the ring and tube and wherein said outwardly crowded tube end extremity is securely clamped.

2. The combination of a flexible tube structure and a coupling therefor comprising a tube structure with an impervious inner tube and a flexible outer sleeve of a material of higher tensile and burst strength than said inner tube and not subject to any substantial compression or deformation and confining said inner tube against expansion by fluid pressure within the inner tube, a male coupling element having a hollow tapered extension projected into an end of the tube structure between said inner tube and said outer sleeve, said extension having a bore therein of substantially the same diameter as the internal diameter of the inner tube and a smooth uninterrupted counterbore snugly surrounding said inner tube and terminating in a shoulder against which the end of the inner tube engages, said inner tube being formed solely of rubber or equivalent material readily subject to expansion by internal pressure and conformable in sealing contact against the counterbore wall incidental to such expansion, and clamping means threadedly connected with said male coupling member for securely clamping said outer sleeve in direct frictional engagement between the external surface of said tapered extension and said clamping means.

ARTHUR L. PARKER.